United States Patent
El-Moussa et al.

(10) Patent No.: US 11,785,029 B2
(45) Date of Patent: Oct. 10, 2023

(54) VEHICULAR NETWORK SECURITY

(71) Applicant: British Telecommunications Public Limited Company, London (GB)

(72) Inventors: Fadi El-Moussa, London (GB); Karl Smith, London (GB)

(73) Assignee: British Telecommunications Public Limited Company, London (GB)

(*) Notice: Subject to any disclaimer, the term of this patent is extended or adjusted under 35 U.S.C. 154(b) by 200 days.

(21) Appl. No.: 15/733,588

(22) PCT Filed: Mar. 4, 2019

(86) PCT No.: PCT/EP2019/055341
§ 371 (c)(1),
(2) Date: Sep. 4, 2020

(87) PCT Pub. No.: WO2019/170616
PCT Pub. Date: Sep. 12, 2019

(65) Prior Publication Data
US 2021/0006578 A1 Jan. 7, 2021

(30) Foreign Application Priority Data
Mar. 5, 2018 (EP) ..................................... 18159885

(51) Int. Cl.
*H04L 9/40* (2022.01)
*H04W 4/48* (2018.01)
(Continued)

(52) U.S. Cl.
CPC .......... *H04L 63/1425* (2013.01); *G06N 7/01* (2023.01); *H04L 67/12* (2013.01); *H04W 4/48* (2018.02)

(58) Field of Classification Search
CPC ...... H04W 4/48; H04L 63/1425; H04L 67/12; H04L 2012/40215; H04L 2012/40273;
(Continued)

(56) References Cited

U.S. PATENT DOCUMENTS

2004/0117090 A1* 6/2004 Samukawa ........... G01S 17/931
701/45
2008/0071465 A1* 3/2008 Chapman ............. G08G 1/0104
701/117
(Continued)

FOREIGN PATENT DOCUMENTS

| EP | 3217333 A1 | 9/2017 | |
| JP | 2009287624 A | * 12/2009 | |
| WO | WO-2018028834 A1 | * 2/2018 | ............... G06N 5/02 |

OTHER PUBLICATIONS

International Search Report and Written Opinion, International Application No. PCT/EP2019/055341, dated Mar. 22, 2019, 11 pages.
(Continued)

*Primary Examiner* — George C Neurauter, Jr.
*Assistant Examiner* — Mehulkumar J Shah
(74) *Attorney, Agent, or Firm* — PATTERSON THUENTE, P.A.

(57) ABSTRACT

A computer implemented security method operable with a communications network in a vehicle, the network communicatively connecting devices including sensors and actuators in the vehicle such that information provided by sensors and states of actuators are determinable by data communicated via the network, the method including defining a Markov decision process model for the vehicle, the model specifying states of the vehicle and actions constituting transitions between states, wherein a state of the vehicle is indicated by information provided by one or more sensors and a state of one or more actuators, and an action corre-
(Continued)

sponds to a change in the information provided by one or more sensors and/or a change to a state of one or more actuators, each action having associated a probability of occurrence; determining, by accessing data communicated via the network, a current state of the vehicle in the model; accessing data communicated via the network; responsive to the accessed data indicating an action to change the vehicle state to a new state, determining, from the model, a probability of the action; responsive to a determination that the determined probability falls below a predetermined threshold probability, generating an indication that the vehicle state transition is anomalous.

9 Claims, 4 Drawing Sheets

(51) Int. Cl.
*H04L 67/12* (2022.01)
*G06N 7/01* (2023.01)

(58) Field of Classification Search
CPC . H04L 9/40; H04L 12/40; H04L 29/06; H04L 29/08; G06N 7/005; G06N 7/00; G06N 7/01; G06F 21/554; G06F 21/55
See application file for complete search history.

(56) References Cited

U.S. PATENT DOCUMENTS

| | | | |
|---|---|---|---|
| 2017/0106766 A1* | 4/2017 | Duan | B60L 58/15 |
| 2017/0279834 A1 | 9/2017 | Vasseur et al. | |
| 2018/0276915 A1* | 9/2018 | Ganguli | G06Q 30/018 |
| 2019/0185009 A1* | 6/2019 | Werner | B60W 50/0097 |
| 2019/0280954 A1* | 9/2019 | Volos | G06N 7/01 |
| 2020/0097003 A1* | 3/2020 | Wray | B60K 31/00 |

OTHER PUBLICATIONS

Narayanan Sandeep Nair et al., "OBD_SecureAlert: An Anomaly Detection System for Vehicles", 2016 IEEE International Conference on Smart Computing (SMARTCOMP), IEEE, May 18, 2016, pp. 1-6, XP032917406.
Anonymous: "Q-learning Machine learning and data mining Machine learning portal", Feb. 22, 2018, XP055498973, retrieved from the Internet: https://en.wikipedia.org/w/index.php?title=Q-learning&oldid=826975938.
GB Search Report, GB Application No. GB 1803473.6, dated Aug. 24, 2018. 3 pages.
European Search Report, Application No. 18159885.5, dated Aug. 22, 2018, 10 pages.
Richard S. Sutton et al., "Reinforcement Learning: An Introduction", Nov. 5, 2017, The MIT Press, Cambridge, Massachusetts, London, England, 445 pages.
Christopher John Cornish Hellaby Watkins, "Learning from Delayed Rewards" King's College, Thesis Submitted for Ph.D., May 1989, 241 pages.
Communication Pursuant to Article 94(3) EPC for Application No. 19707407.3, dated Apr. 20, 2022, 5 pages.

* cited by examiner

VEHICULAR NETWORK SECURITY

PRIORITY CLAIM

The present application is a National Phase entry of PCT Application No. PCT/EP2019/055341, filed Mar. 4, 2019, which claims priority from European Patent Application No. 18159885.5, filed Mar. 5, 2018, each of which is hereby fully incorporated herein by reference.

TECHNICAL FIELD

The present disclosure relates to a security method for a vehicle. In particular, it relates to security of a vehicle communications network.

BACKGROUND

Modern automobiles are increasingly provided with data networks providing communication between vehicle subsystems. Such networks can be used to provide services such as engine and transmission management, actuator controls and advanced features such as driving assistance including parking assistance, collision detection, collision avoidance, automated and/or assistive braking, adaptive cruise control and the like.

Data networks are susceptible to attack and vehicles are susceptible to negligent control. In vehicular applications, the consequences of unauthorized, malicious and/or negligent access to a vehicle data network can be serious including a risk to the safety and security of a vehicle and ultimately a risk to life.

SUMMARY

Consequently, there is a need to mitigate these risks.

The present disclosure accordingly provides, in a first aspect, a computer implemented security method operable with a communications network in a vehicle, the network communicatively connecting devices including sensors and actuators in the vehicle such that information provided by sensors and states of actuators are determinable by data communicated via the network, the method comprising defining a Markov decision process model for the vehicle, the model specifying states of the vehicle and actions constituting transitions between states, wherein a state of the vehicle is indicated by information provided by one or more sensors and a state of one or more actuators, and an action corresponds to a change in the information provided by one or more sensors and/or a change to a state of one or more actuators, each action having associated a probability of occurrence; determining, by accessing data communicated via the network, a current state of the vehicle in the model; accessing data communicated via the network; responsive to the accessed data indicating an action to change the vehicle state to a new state, determining, from the model, a probability of the action; responsive to a determination that the determined probability falls below a predetermined threshold probability, generating an indication that the vehicle state transition is anomalous.

In some embodiments, the predetermined threshold probability is based on a set of all possible actions in the current vehicle state defined in the model and probabilities associated with each action in the set such that the predetermined threshold probability serves to identify relatively improbable actions.

In some embodiments, the predetermined threshold probability is a proportion of a mean probability for all actions in the set.

In some embodiments, the Markov decision process model is defined empirically based on observation of vehicle states and actions in acceptable use.

In some embodiments, the Markov decision process model is defined by a reinforcement machine learning method based on observation of vehicle states and actions in acceptable use.

In some embodiments, the reinforcement machine learning method is a Q-learning reinforcement method based on a predetermined definition of vehicle states and actions and using a reward function wherein actions leading to desirable and/or acceptable vehicle states are attributed relatively greater reward so as to inform the Q-learning method to assign relatively greater probabilities to actions with relatively greater rewards.

In some embodiments, the method further comprises, responsive to the anomalous indication, precluding the transition of the vehicle to the new state by interrupting the action.

In some embodiments, the action involves a change in state of at least one actuator, and interrupting the action includes preventing the action by preventing a change of state of the at least one actuator.

In some embodiments, the action arises from a change in the information provided by one or more sensors, and interrupting the action includes forcing a transition of the vehicle state to a third state as a reactive state.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION OF THE DRAWINGS

The modern automobile may have many electronic control units (ECU) for various subsystems. Commonly, an ECU is provided for engine control. Additional ECUs can be provided for other functions and features of a vehicle such as transmission, airbags, antilock braking/ABS, cruise control, electric power steering, audio systems, power windows, doors, mirror adjustment, battery and recharging systems for hybrid/electric cars, etc. Some of these form independent subsystems though communications among others can be essential.

A vehicle subsystem may need to control actuators and/or receive feedback from sensors. For example, an auto start/stop facility can require sensor input to inform vehicle speed, steering angle and engine temperature. An electronic parking brake providing a "hill hold" function can require sensor input from tilt sensors and road speed sensors. Such sensors can have additional function, such as tilt sensors employed for a burglar alarm system, or road speed sensors employed by antilock braking, engine control or traction control functions. Parking assist can respond to engagement of reverse gear with information provided by a transmission control unit. There may also be an associated adjustment of door-mirrors to assist with reversing. Auto lane assist and collision avoidance systems can require information from external sensors (such as may be used for parking) and/or cameras capable of providing proximity data and road feature data for a system such as a lane departure warning system. Such information can also be used to inform an automatic braking or brake assist facility, vehicle steering assistance for collision avoidance, or adaptive cruise control including either or both of speed and proximity management and lane assistance through assisted steering.

Sensors and actuators in vehicles increasingly interoperate by communicating via a vehicle communications channel such as a common communications bus, wired or wireless communication means and/or regulated notification and/or communication modulators. Such communication channels are hereinafter referred to as a communications network in the vehicle. For example, the communications network can be a wired, wireless or combination computer network for communicating information from at least a subset of sensors and communicating signals and information to (and potentially from) at least a subset of actuators. Some sensors and/or actuators may be grouped into vehicle subsystems such as an engine management system, a transmission control system, a ventilation system or the like, and such systems can optionally associate with or include a control unit such as an ECU. The function, purpose and application of any particular ECU is beyond the scope of this description though it can conceivably include one or more of, inter alia: a controlling function for controlling sensors/actuators; a communication function for communicating with sensors/actuators such as providing an interface between sensors/actuators and the communications network, such interface may provide, for example, data format conversion, data standardization or normalization, data collection and/or aggregation; a monitoring function for sensors/actuators; an alerting function; intelligence such as one or more of software, hardware, firmware or other logic operable to manage, trigger, operate or instruct actuators, such management may be responsive to sensors within the subsystem or information received via the communications network from sensors, actuators and/or other subsystems; and other functions as will be apparent to those skilled in the art.

Communications networks are vulnerable to attack, unauthorized access, malicious access, malicious or negligent communication or interception. For example, vehicle actuators may be controllable via a vehicle communications network so putting a vehicle and its occupants at risk of harm. Vehicle security can be compromised putting a vehicle at risk of unauthorized physical access and theft. Vehicle subsystems can be modified, manipulated or maliciously or negligently controlled which can affect vehicle occupants and other road users risking injury and possible death.

Embodiments of the present disclosure include a modelling system for building a Markov decision process (MDP) as a model of the operation of a vehicle. MDPs specify states and actions constituting transitions between states, each action having a probability of occurrence, as is known in the art. In accordance with embodiments of the present invention, an MDP model is applied such that a state of a vehicle as indicated by information provided by one or more sensors and a state of one or more actuators serves to identify a state in the MDP for the vehicle. Actions for transitioning between states in the MDP correspond to a change in the information provided by one or more sensors and/or a change to a state of one or more actuators.

In embodiments of the present disclosure, the MDP model is generated to include a probability associated with each action. The probabilities can be determined empirically and/or based on a reinforcement learning approach as is described below. Thus, the model can be generated during a training, learning or modelling phase of operation of a vehicle. Subsequently, for the vehicle in normal operation, the model is employed to identify deviations from predetermined acceptable state transitions as anomalous state transitions, such anomalies serving, for example, to trigger responsive, remedial, protective or alerting actions. Thus, embodiments of the present invention further include a monitoring system operable with the MDP model to monitor a state of a vehicle and actions triggering state transitions and to determine deviations from predetermined acceptable state transitions based on action probabilities and a predetermined threshold probability. For example, actions arising in the vehicle that have a probability in the MDP model below a threshold probability can be identified as anomalous. Most preferably, the threshold probability is based on probabilities of all actions in a set of all possible actions in a current vehicle state such that the predetermined probability threshold serves to identify relatively improbable actions. For example, a threshold probability can be predetermined as a predetermined proportion of a mean probability of all actions from a current vehicle state, such as 20%, 25%, 30%, 35%, 40%, 45%, 50%, 55% or 60% of the mean probability. In some embodiments, the predetermined portion of a mean probability can itself be determined based on one or more attributes, statistics or features of the set of actions for a vehicle state, such as one or more of: a number of actions in the set; a standard deviation of the probabilities of actions in the set; a range of probabilities of action in the set; and other attributes of probabilities of actions in the set.

Thus, in this way embodiments of the present disclosure identify anomalous vehicle state transitions, responsive to which reactive measures can be taken. Such reactive measures can include protecting the vehicle, its occupants and/or other road users by one or more of: preventing, precluding or inhibiting a state transition of the vehicle state; forcing a state transition to a different vehicle state such as a reactive state as a state of the vehicle for alerting vehicle operators, protecting the vehicle, its occupants or other road users, evading or mitigating a certain or possible harmful outcome such as a collision, or other reactive states as will be apparent to those skilled in the art.

Figure 1:
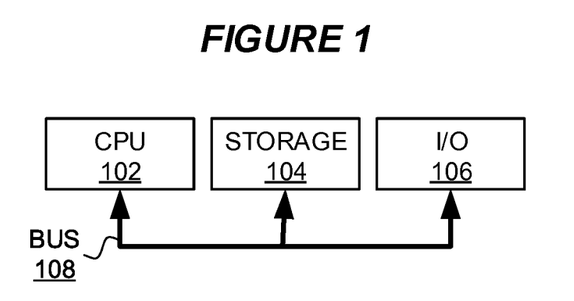
FIG. 1 is a block diagram a computer system suitable for the operation of embodiments of the present disclosure.

FIG. 1 is a block diagram of a computer system suitable for the operation of embodiments of the present disclosure.

A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
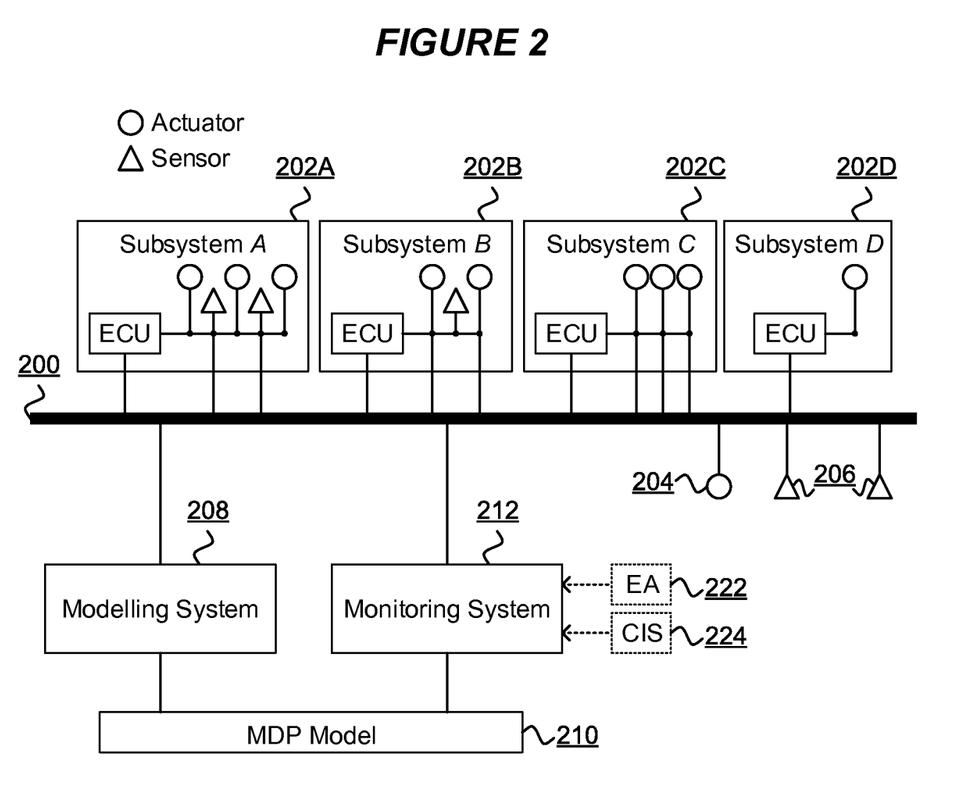
FIG. 2 is a component diagram of a vehicle communications network for a vehicle in accordance with embodiments of the present disclosure.

FIG. 2 is a component diagram of a vehicle communications network 200 for a vehicle in accordance with embodiments of the present disclosure. The communications network 200 is illustrated as a singular network though it will be appreciated that a combination of two or more suitable interoperating network mechanisms may be employed including wired and or wireless networks. The vehicle communications network 200 is provided for a vehicle such as an automobile, a transport vehicle or the like, and provides communications facilities between sensors and actuators. Notably, the communications network 200 can additionally provide communication facilities between other components though these are beyond the scope of this description. Sensors and actuators can operate in direct communication via the network 200 such as sensors 206 and actuator 204. Alternatively, sensors and actuators can operate as part of one or more subsystems 202A-202D of the vehicle. A subsystem is a collection of one or more sensors and/or actuators and can be optionally associated with an electronic control unit (ECU). Sensors and actuators within subsystems may communicate via the network 200 directly, via an ECU or conceivably both.

Examples of sensors can include, inter alia: speed sensors; position, location and/or orientation sensors; incline sensors; environmental sensors such as humidity, temperature, rain, snow, fog, wet, light, dark or other such similar sensors; traction sensors; emission sensors; occupant sensors such as presence sensors (e.g. seat sensors), safety device sensors (e.g. seatbelt sensors), occupant characteristic sensors (e.g. seatbelt extension measurement, weight sensors, height sensors and the like); proximity and object detection sensors such as reversing sensors, vehicle proximity sensors, range detectors and the like; mass air flow sensors; engine speed sensors; tire pressure sensors; fuel level, fuel quality, fuel temperature, fuel pressure, fuel-air-mix and/or other fuel sensors; voltage and/or current sensors; telematics sensors; crankshaft angle sensors; camshaft angle sensors; exhaust oxygen sensors; exhaust gas recirculation valve position sensors; spark knock sensors; fuel vapor pressure sensor; engine coolant temperature sensor; engine compartment temperature sensor; manifold air temperature sensor; transmission oil temperature sensor; anti-lock brake sensor; windshield crack sensor; door or tailgate ajar sensors; air conditioning pressure sensor; steering angle and/or position sensor; crash and/or impact sensors; pedal, transmission or switch change sensors; and other sensors as will be apparent to those skilled in the art.

Examples of actuators can include: engine actuators such as actuators to adjust engine speed, performance, activation state and the like; steering actuators such as actuators to adjust steering direction, angle, responsiveness and the like; transmission actuators such as actuators to adjust a manual or automatic gearbox including a gear or range selection, clutch operation, vehicle direction and the like; illumination actuators for changing the state of internal and or external indicators such as lights and the like; environmental facilities such as actuators for operating wipers, heaters, heated vehicle areas or parts such as passenger or engine compartments, vehicle glazing or panels; ventilation actuators to adjust ventilation facilities such as fans, air-intake settings, air conditioning, air recirculation, air temperature and the like; braking actuators such as all-wheel, individual wheel or subset combination braking, antilock braking facilities and the like; driver and/or occupant information facilities such as displays, indicators, screens, lights, sounds, buzzers, audible messages and the like; feedback facilities such as haptic feedback for drivers and/or occupants and the like; traction control facilities; and other actuators as will be apparent to those skilled in the art. Notably, an actuator has associated characteristics that may be adjustable, adaptable, modifiable, configurable or otherwise changeable. For example, wipers can be inactive, active at a first speed, active at a second speed, intermittently active and so forth. Information regarding, about or a status of such characteristics for an actuator can be communicated via the network to other components communicating thereby so as to represent a "state" of the actuator". E.g. wipers can be in an "intermittently active" state. Furthermore, there may be multiple characteristics of an actuator, and each characteristic can have a particular status (e.g. wiper activity characteristic can be "true" to indicate that a wiper is active; and wiper speed characteristic can be "2" to indicate a second speed of wiper action). The state of any particular actuator is a set of one or more statuses of characteristics of the actuator. Notably, the state of an actuator is different to, and distinct from, the status of a vehicle in a MDP model since the state of an actuator relates only to the particular actuator. Further, a subsystem may have a state that may be derived from, compiled of, consist of or aggregated from characteristics of one or more actuators within the subsystem and/or information from one or more sensors in the subsystem.

FIG. 2 also includes a modelling system 208 as a hardware, software, firmware or combination component for modelling the operation of the vehicle in a training mode of operation in which the vehicle is operated in a predetermined acceptable manner of operation. For example, in the training mode of operation, the vehicle may be operated in a manner such that the network 200 and actuators and sensors of the vehicle are isolated from potential sources of malicious or negligent access, intrusion or the like, such as within a controlled, managed and/or contained environment. The modelling system 208 is operable to generate an MDP model 210 modelling a plurality of vehicle states for the vehicle and, for each state, one or more actions for transitioning the vehicle to another state, the actions having associated probabilities.

In one embodiment, the set of vehicle states and actions between states for the vehicle are predefined, such as from a manufacture of the vehicle or from a prior analysis of the vehicle subsystems, actuators and sensors. In such embodiments, the modelling system 208 is configured to generate the MDP model 210 by determining probabilities for association with the actions within set of actions for each state.

Additionally, or alternatively, the set of vehicle states and actions between states can be at least partly determined by an observation and/or learning process such as an empirical process based on observation of the vehicle operating in the training mode of operation according to the predetermined acceptable manner of operation of the vehicle.

The predetermined acceptable manner of operation of the vehicle can be defined and/or determined by one or more of, inter alia: a manufacturer of the vehicle; vehicle standards organizations and agencies including government, safety, academic and other organizations; driver, owner or operator preferences for the vehicle; a database of acceptable, preferred, or otherwise identified vehicle states and/or actions; or other methods as will be apparent to those skilled in the art. Generally, in embodiments of the disclosure, the predetermined acceptable manner of operation corresponds to operations of the vehicle resulting in the vehicle being placed in to vehicle states that are preferred in a production mode of operation of the vehicle (i.e. in normal use after the training mode of operation).

The modelling system 208 thus determines probabilities for association with actions for each vehicle state in a set of vehicle states, with actions having a greater probability indicating a more typical, acceptable and/or safe action at a vehicle state than actions having a lower probability. In one embodiment, a reinforcement machine learning algorithm is employed to determine the probabilities associated with actions in the set of vehicle states and actions to arrive at the MDP model 210. For example, the Q-Learning reinforcement method (as first introduced in "Learning from Delayed Rewards" (Watkins, King's College, 1989) and described in "Reinforcement Learning: An Introduction" (Sutton and Barto, 2017), in particular section 6.5) can be employed based on a definition of vehicle states and possible actions using a reward function in which actions leading to predetermined desirable and/or acceptable vehicle states are attributed relatively greater reward. In this way, the Q-Learning method can, for example, assign relatively greater probabilities to actions with relatively greater reward. The reinforcement learning method can use back-propagation of rewards such that states leading to states having high reward also enjoy some reduced proportion of the reward, and therefore improvements to the probabilities of actions linking those states, to emphasize the desirable output state and paths leading to it. Thus, in this way, the MDP model 210 is generated including vehicle states, actions at vehicle states and probabilities of each action.

Figure 3:
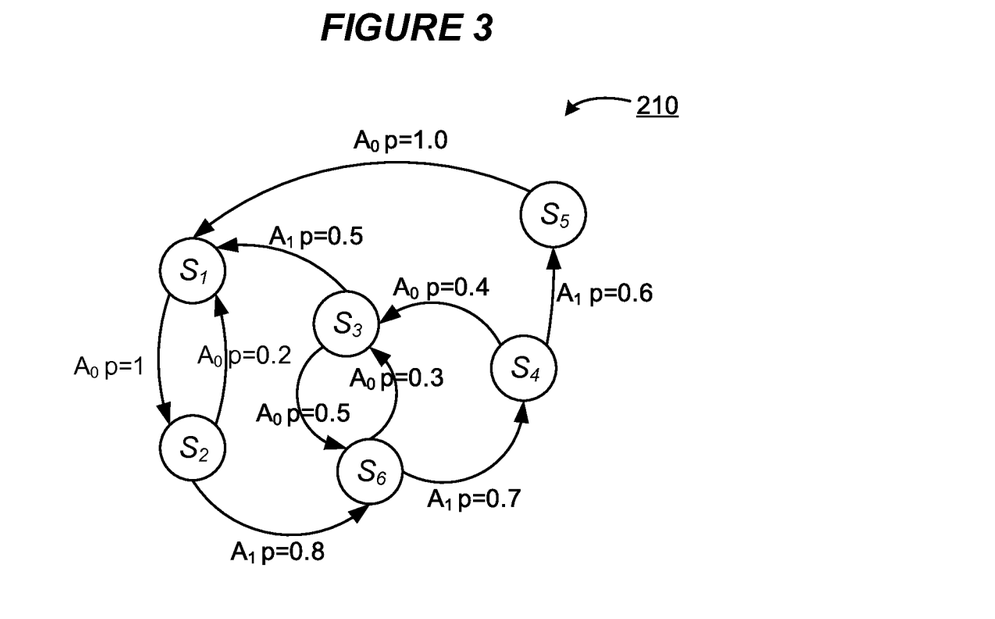
FIG. 3 is an illustrative depiction of an exemplary Markov decision process model suitable for embodiments of the present disclosure.

FIG. 3 is an illustrative depiction of an exemplary Markov decision process model 210 suitable for embodiments of the present disclosure. The model 210 of FIG. 3 includes five states $S_1$ to $S_5$ each having actions (outgoing arrows), with each action having associated a priority p. For example, a vehicle in state $S_1$ will transition to state $S_2$ with a priority of 1 (i.e. certainty). Subsequently, the vehicle will transition to state $S_6$ with a priority of 0.8 or to state $S_1$ with a priority of 0.2. This, in this way the vehicle states, relationships between the vehicle states, and the probability of transitions between vehicle states is represented by the MDP model 210.

Returning to FIG. 2, the vehicle of FIG. 2 also includes a monitoring system 212 as a software, hardware, firmware or combination component for accessing data communicated via the network 200 to determine the vehicle state in the MDP model 210. Further, the monitoring system 212 is operable to access data communicated via the network 200 to identify an indication of an action occurring in, with or by the vehicle to change the vehicle state to a new state.

Data accessed or obtained by the monitoring system 212 via the network 200 can include, for example, indications of actuator or subsystem state received by, from or obtained by the monitoring system 212 from subsystems 202A-202D or actuators. Additionally, or alternatively, such data can include sensor information obtained from, or communicated by, subsystems 202A-202D or sensors.

In some embodiments, at least some data communicated via the network 200 may be secured by, for example, encryption or the like. In such embodiments the monitoring system 212 operates as a trusted component operable to access such data by, for example, decrypting the data, such as by the monitoring system 212 having access to one or more cryptographic keys (or a separate security component having or accessing such keys) for decrypting such data.

Using accessed data communicated via the network 200, the monitoring system 212 determines a vehicle state (or a most likely vehicle state in the event of only partial or insufficient information) of the vehicle in the MDP model 210. Furthermore, using such data, the monitoring system 212 identifies indications of an action that would transition the vehicle from its current vehicle state to a new vehicle state. In one embodiment, the occurrence of such an action is determined with reference to the MDP model 210 by identifying a set of all actions available for the vehicle in the current vehicle state and, for each action, identifying a subsequent state that would be achieved should the action take place. Each state in the set of identified subsequent states would constitute a potential new state of vehicle, and one of the potential new states is selected from the set of identified subsequent states based on the data received via the network 200.

Figure 6:
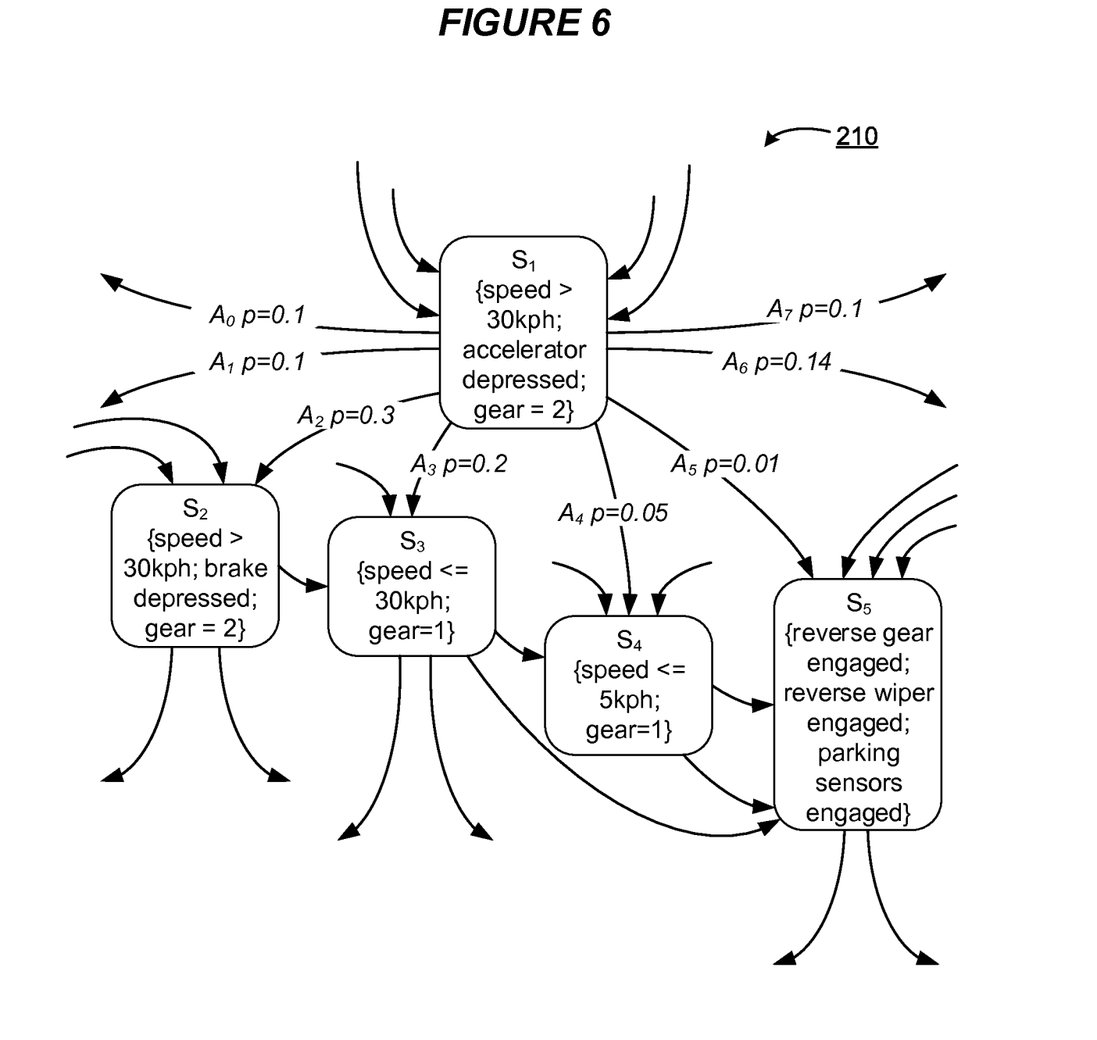
FIG. 6 illustrates an exemplary partial Markov decision process model in accordance with an embodiment of the present disclosure.

By way of example, consider the exemplary partial Markov decision process model 210 of FIG. 6. This model includes a current state $S_1$ in which vehicle speed is greater than 30 kph, the accelerator is depressed and a second gear is selected. This information is determined by the monitoring system 212 from data communicated via the network 200. For example: the vehicle speed can be determined from data originating from a speed sensor; the state of the accelerator can be determined from an accelerator pedal sensor; and one or more states of actuators in the transmission system will indicate the current gear. In this vehicle state $S_1$, if the monitoring system 212 accesses data communicated via the network 200 indicating that the conditions of vehicle state $S_5$ were being met then the monitoring system 212 can conclude that action $A_5$ to transition to state $S_5$ is being performed. For example, such data could be indicated by: transmission actuator state changes to reverse gear; a rear-screen wiper actuator having a state of "active"; and a reverse parking sensor system actuator having a state of "active" and/or proximity sensor data being received from reverse parking sensors. Thus, in this way, the monitoring system 212 is operable to determine a current vehicle state and a new vehicle state with reference to the MDP model 210.

In use, the monitoring system 212 is further operable to determine a probability of a detected action with reference to the MDP model 210. Thus, in the previous example where the modelling system 212 concluded action $A_5$ occurs to transition the vehicle to vehicle state $S_5$, the monitoring system 212 also determines the probability of action $A_5$ with reference to the MDP model 210 which, according to FIG. 6, is p=0.01. Thus, the monitoring system 212 determines that a probability of the observed action $A_5$ occurring for the vehicle in current state $S_1$ is 0.01. Subsequently, the monitoring system 212 determines if the probability of the determined actions falls below a predetermined threshold probability.

In some embodiments, the predetermined threshold probability serves to identify relatively improbable actions. In one embodiment, the predetermined threshold probability can be predefined as a constant or adjustable value for all actions or for all actions of a particular vehicle state. In other embodiments, more sophisticated approaches are adopted in which the predetermined probability is evaluated or calculated based on a set of all possible actions in the current vehicle state. For example, the predetermined probability can be a proportion of a mean probability for all actions in the set, such as 50% of the mean probability. In this way, the relative improbability of a particular action depending on a number and range of probabilities for actions in the set is better assessed.

For example, with reference to FIG. 6, all actions in state $S_1$ include actions $A_0$ to action $A_7$ having probabilities 0.1, 0.1, 0.2, 0.2, 0.05, 0.01, 0.14 and 0.1 respectively. Thus, the mean probability for all actions in state S1 is 1/7 or approximately 0.14. Taking an example threshold probability as a proportion of 50% of the mean probability, the threshold probability is thus 50% of 1/7 which is 1/14 (approximately 0.07). Thus, it can be seen that the probabilities of actions $A_4$ and $A_5$ fall below the threshold probability and are therefore deemed by the monitoring system 212 as sufficiently improbable that they constitute anomalous actions.

An anomalous action is an improbable action (determined based on a predetermined threshold probability as described above) indicating that a vehicle state transition is likely anomalous because it is not determined to be sufficiently probable based on the MDP model 210. Thus, in this way, the monitoring system 212 can identify anomalous vehicle state transitions, such identification being suitable for triggering responsive and/or reactive measures.

In one embodiment, the identification of an anomalous vehicle state transition triggers a process of precluding, preventing the vehicle state transition or of reverting, reversing or returning the vehicle to its previous state. This response to the anomalous identification is practical in certain circumstances where the new vehicle state arising from the anomalous transition can be readily reversed, such as where an actuator is modified (e.g. activated, deactivated, adjusted)—the modification can be undone. However, preventing or precluding the anomalous vehicle state transition may not be possible in all cases, such as where the new vehicle state represents a state that cannot be returned to its immediately preceding state—such as the vehicle being steered into imminent danger.

Thus, in some embodiments, the identification of an anomalous vehicle state transition can trigger a further state transition to a reactive or responsive state such as a safety state in which the vehicle is operated to mitigate the effects of the anomalous state transition. For example, a state or series of states constituting an evasive maneuver may be employed, or the vehicle may be stopped by rapid deceleration or the like.

The nature of the response to the identification of an anomalous vehicle state transition can differ depending on a determined seriousness of the transition. In some cases, the response may merely involve generating an alert or indication to the vehicle operator or other road users, or registering the anomaly in a vehicle log for later investigation.

In one embodiment, the modelling system 208 is arranged to generate potentially multiple MDP models 210 such as models aligned to different subsystems or sets of subsystems of the vehicle. For example, MDP models can include: a model relating to the drive, engine and transmission system; a model relating to driver indications (signs, signals, displays, dials); a model relating to comfort and convenience (seating, heating, ventilation, air conditioning); and a model relating to vehicle safety (parking sensors, lane departure, adaptive cruise control, emergency braking). In such an embodiment, the vehicle can be in one vehicle state within each model at a particular point in time and the monitoring system 212 is configured to monitor the vehicle state in each MDP model to identify anomalous state transitions across all models.

Returning to FIG. 2, the monitoring system 212 is also optionally operable to receive information from, and act responsive to, external components such as an environmental alerts (EA) component 222 and a central intelligence system (CIS) component 224. For example, the EA component 222 can communicate information to the vehicle regarding the environment surrounding the vehicle such as accident, incident, congestion or other information. Such information can be used to define states as part of the MDP model 210 such that states and probabilities of actions differ according to information received from the EA component 222. Similarly, the CIS component 224 can be a centralized component for vehicles providing information regarding global threats, known intrusion symptoms, driving behavior that is known to be problematic, etc. Such information received from the EA component 222 can additionally be used to interpret the MDP model 210 appropriately. In some embodiments, the EA 222 and CIS 224 data is additionally or alternatively used by the modelling system 208 to define a more sophisticated MDP model 210 for the vehicle.

Figure 4:
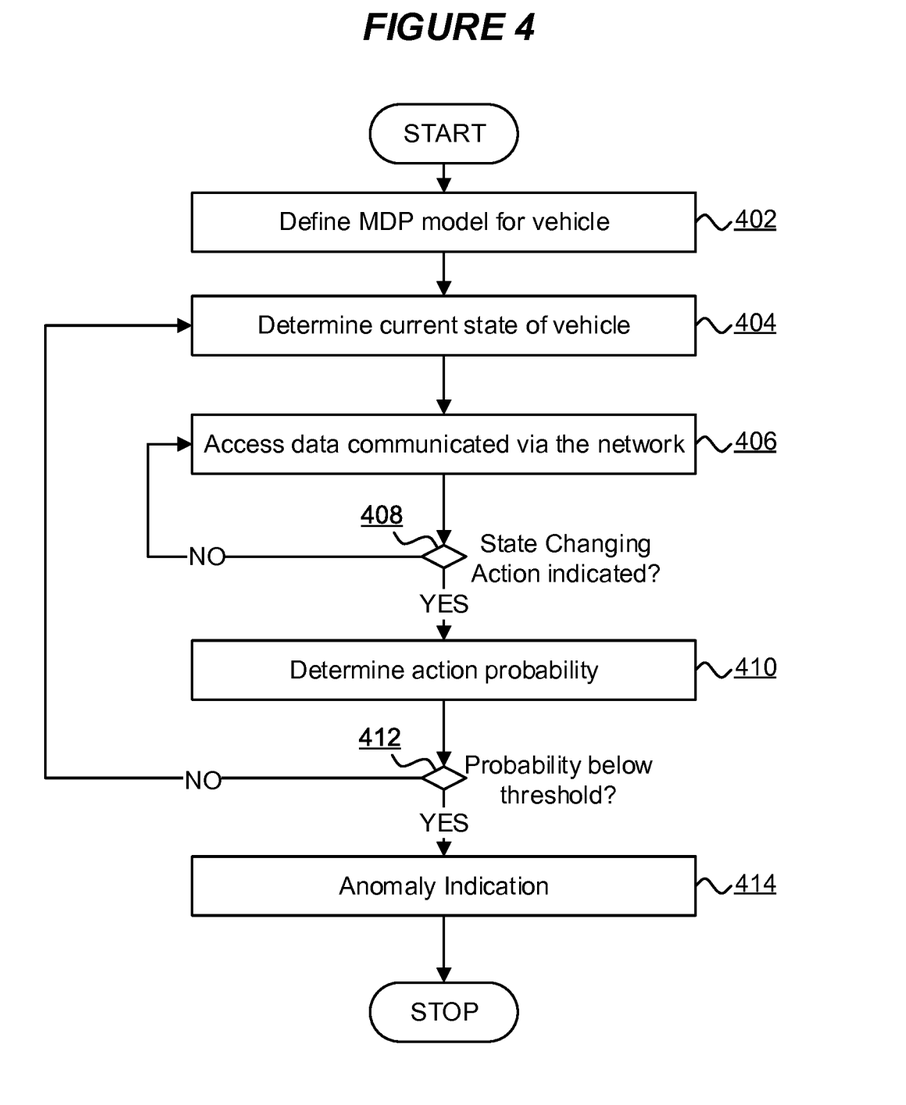
FIG. 4 is a flowchart of a method operable with a communications network in a vehicle to generate an indication that a vehicle state transition is anomalous in accordance with embodiments of the present disclosure.

FIG. 4 is a flowchart of a method operable with a communications network 200 in a vehicle to generate an indication that a vehicle state transition is anomalous in accordance with embodiments of the present disclosure. At 402 an MDP model 210 is defined for the vehicle, the model specifying states of the vehicle and actions constituting transitions between states. A state of the vehicle is indicated by information provided by one or more sensors and a state of one or more actuators, and an action corresponds to a change in the information provided by one or more sensors and/or a change to a state of one or more actuators. Each action has associated a probability of occurrence. At 404 the method determines a current state of the vehicle in the model by accessing data communicated via the network. At 406 the method accessing data communicated via the network so that, at 408, the method can determine if a state changing action has occurred. Such a state changing action can be identified by the indication of the vehicle entering a new state. At 410, where a state changing action is determined to have occurred, the method determines a probability associated with the action from the MDP Model 210. At 412 the method determines if the probability is below a threshold probability, and where it is below, the method generates an anomaly indication at 414.

Figure 5:
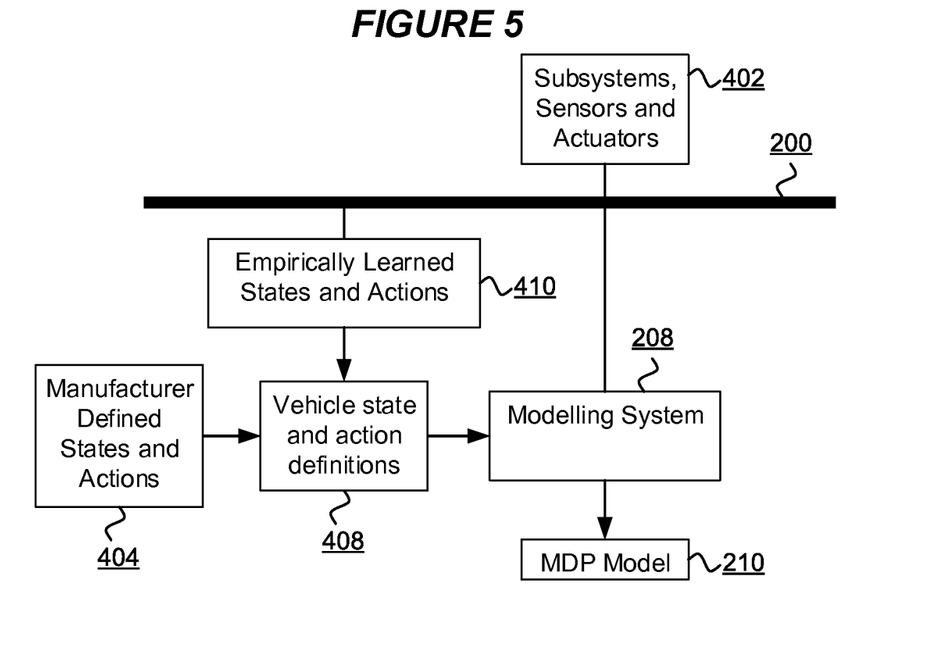
FIG. 5 is a component diagram illustrating the operation of the modelling system in accordance with embodiments of the present disclosure.

FIG. 5 is a component diagram illustrating the operation of the modelling system 208 in accordance with embodiments of the present disclosure. Many of the features of FIG. 5 are identical to those described above with respect to FIG. 2 and these will not be repeated here. FIG. 5 illustrates one embodiment for the generation of the MDP model 210 of FIG. 2 and, in particular, the definition of the set of states and actions of the MDP model 210. The modelling system 208 of FIG. 5 receives vehicle state and action definitions 408 based on two data sources. A first data source is a manufacturer defined set of states and actions 404 that can be defined to represent the possible states and actions for a vehicle according to the manufacturer. Further, a second data source is information received from an empirically learned set of states and actions 410. The empirically learned information 410 can arise from use or operation of the vehicle in the training mode of operation and/or use of the vehicle in a production (in use) mode of operation. Both data sources constituting promising bases for the definition of vehicle states and actions 408 on which basis the modelling system 208 determines action probabilities as hereinbefore described.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention. It will be understood by those skilled in the art that, although the present invention has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented security method operable with a communications network in a vehicle, the communications network communicatively connecting devices including sensors and actuators in the vehicle such that information provided by the sensors and states of the actuators are determinable by data communicated via the communications network, the method comprising:

defining a Markov decision process model for the vehicle, the Markov decision process model specifying states of the vehicle and actions constituting transitions between the states, wherein a state of the vehicle is indicated by information provided by one or more sensors and a state of one or more actuators, and an action corresponds to a change in at least one of the information provided by the one or more sensors or a change to the state of the one or more actuators, each action having associated a probability of occurrence;

determining, by accessing data communicated via the communications network, a current state of the vehicle in the Markov decision process model;

accessing data communicated via the communications network;

responsive to the accessed data indicating an action to change the current vehicle state to a new vehicle state, determining, from the Markov decision process model, a probability of the action; and responsive to a determination that the determined probability falls below a predetermined threshold probability, generating an indication that the vehicle state transition is anomalous, wherein the predetermined threshold probability is a proportion of a mean probability for actions in a set of all possible actions in the current state of the vehicle and is based on the set of all possible actions in the current state of the vehicle defined in the Markov decision process model and probabilities associated with each action in the set such that the predetermined threshold probability serves to identify relatively improbable actions.

2. The method of claim 1, wherein the Markov decision process model is defined empirically based on observation of vehicle states and actions in acceptable use.

3. The method of claim 1, wherein the Markov decision process model is defined by a reinforcement machine learning method based on observation of vehicle states and actions in acceptable use.

4. The method of claim 3, wherein the reinforcement machine learning method is a Q-learning reinforcement method based on a predetermined definition of vehicle states and actions and using a reward function wherein actions leading to a desirable vehicle state or an acceptable vehicle state are attributed relatively greater reward so as to inform the Q-learning reinforcement method to assign relatively greater probabilities to actions with relatively greater rewards.

5. The method of claim 1, further comprising, responsive to the anomalous indication, precluding the transition of the vehicle to the new vehicle state by interrupting the action.

6. The method of claim 5, wherein the action involves a change in the state of at least one actuator, and interrupting the action includes preventing the action by preventing a change of the state of the at least one actuator.

7. The method of claim 5, wherein the action arises from a change in the information provided by the one or more sensors, and interrupting the action includes forcing a transition of the vehicle state to a third vehicle state as a reactive state.

8. A computer system comprising:
a processor and memory storing computer program code for performing the method of claim 1.

9. A non-transitory computer readable storage medium storing a computer program element comprising computer program code to, when loaded into a computer system and executed thereon, cause the computer system to perform the method as claimed in claim 1.

* * * * *